S. K. Landes,
Dressing Millstones.
N° 29,701. Patented Aug. 21, 1860.
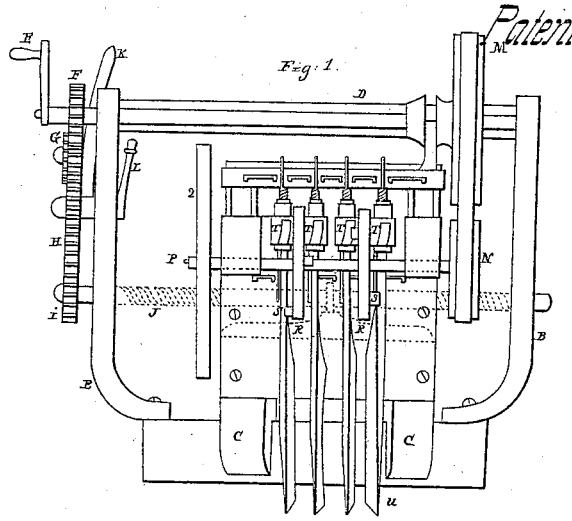
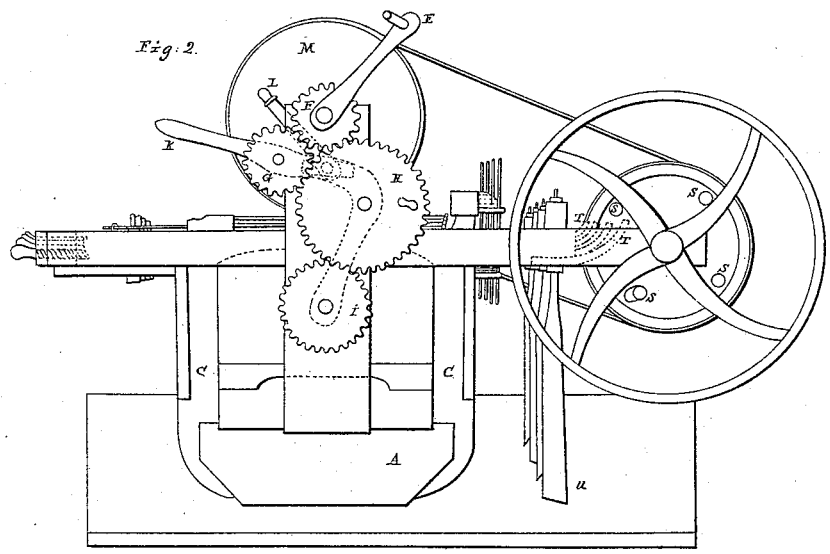
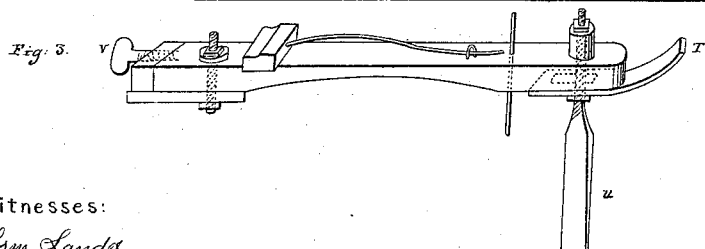
Witnesses:
Abrm Landes
Peter Regerreis
Inventor:
Samuel K Landis
AM. PHOTO-LITHO. CO. N.Y. (OSBORNE'S PROCESS)

UNITED STATES PATENT OFFICE.

SAMUEL K. LANDES, OF WEST COCALICO TOWNSHIP, LANCASTER COUNTY, PENNSYLVANIA.

MACHINE FOR DRESSING MILLSTONES.

Specification of Letters Patent No. 29,701, dated August 21, 1860.

*To all whom it may concern:*

Be it known that I, SAMUEL K. LANDES, of West Cocalico township, county of Lancaster, and State of Pennsylvania, have invented a new and useful Improvement in Machines for Dressing Millstones; and I do hereby declare that the following is a full and exact description thereof, reference being had to the accompanying drawings, and to the letters of reference marked thereon, making a part of this specification.

My invention relates to a certain new arrangement and combination of mechanism operating as hereinafter described.

Figure 1, represents the front end view, and Fig. 2 a side view of the machine; Fig. 3, the spring with its cutter.

To enable others skilled in the art to make and use my invention I will proceed to describe its construction and operation.

A represents a solid, stationary platform with two permanent upright posts B at each side; between these posts the machine moves and slides steadily on the edges of the platform.

C represents the movable frame which supports the machine. Above this frame is the main horizontal driving shaft D (with its crank E) which revolves on top of the posts B. At the one end of this shaft D is a pinion wheel F, which gears into cog wheels G and H and drives the cog wheel I which operates the horizontal screw J, by which the machine is moved from right to left. By the raising or lowering of the lever K the pinion G is thrown in or out of gear with the pinion F, and the revolution of the screw J is immediately reversed. The short lever L works in a slot, and is for the purpose of keeping the cog wheels together, or apart, when geared or ungeared according to the movement from the right or left.

On the opposite end of shaft D is a band wheel M, which drives a smaller band wheel N and shaft P. Upon this shaft P are a fly wheel Q and two wheels R, with pins S at their sides which, as they revolve, the pins S come in contact, alternately, with the ends of the springs T and raise them. The cutters U being fastened and screwed into the springs T are raised with the springs and operate alternately upon the stone beneath.

The machine is moved in any angle, and the knives or cutters U are moved from right to left with the frame C, or vice versa.

A set screw V is attached to the hind end of springs T to lengthen or shorten the springs.

I am aware that there are machines for dressing millstones, so arranged as to direct the course of the cutters but their arrangements I do not claim, but

What I claim as my invention, and desire to secure by Letters Patent, is—

The combination of the movable frame carrying the band wheels springs and cutters, the whole being arranged so as to move from right to left or the reverse by the shifting mechanism, substantially as herein described.

SAMUEL K. LANDES.

Witnesses:
I. FRANKLIN REIGART,
REUBEN K. LANDES.